Patented Aug. 15, 1944

2,355,911

UNITED STATES PATENT OFFICE 2,355,911

HYDRAZIDES AND PROCESS OF PREPARING SAME

Charles Graenacher, Riehen, and Richard Sallmann, Gelterkinden, Switzerland, assignors to Society of Chemical Industry in Basle, Basel, Switzerland, a Swiss firm No Drawing. Application March 20, 1942, Serial No. 435,578. In Switzerland April 22, 1941

17 Claims. (Cl. 260—211)

It has been found that new condensation products are obtained, if monoacylhydrazines containing at least 12 carbon atoms are treated with water-soluble reducing carbohydrates, especially water-soluble reducing mono- or polysaccharides.

The monoacylhydrazines used as starting materials may be derived for example from hydrazine, on the one hand, and from aliphatic, aromatic, aliphatic-aromatic, cycloaliphatic or heterocyclic carboxylic acids containing at least 12 carbon atoms, on the other hand. Among these parent materials may be mentioned: lauric acid-, palmitic acid-, stearic acid-, oleic acid-, para-stearoyl-amino-benzoic acid-hydrazide, further monoacylhydrazines which are derived from naphthenic acids containing at least 12 carbon atoms. Monoacylhydrazines containing at the same N-atom an acyl group and a hydrocarbon radical—which, if desired, may be substituted—for example a hydroxyalkyl or phenyl radical, may also be used. As starting materials may further be used hydrazines monoacylated with sulfonic acids, for example with para-lauroylamino-benzene-sulfonic acid.

The monoacylhydrazines to be used as starting materials are either known or may be produced offhand according to analogous processes.

Water-soluble, reducing mono- or polysaccharides which are to be used as starting materials are for example: pentoses, such as arabinose, further hexoses, for instance aldohexoses, such as glucose, galactose, mannose, ketohexosenes, such as fructose, further reducing disaccharides, such as maltose or lactose.

The reaction of the monoacylhydrazines with the water-soluble, reducing mono- or polysaccharides is effected preferably in the heat, advantageously by using solvents, such as glacial acetic acid or alcohol and, if desired, condensing agents.

The products of the invention are hydrazides, in which one hydrazine nitrogen atom is connected with the acyl radical of a carboxylic acid containing at least 12 carbon atoms and in which the other hydrazine nitrogen atom is attached to a radical of a water-soluble reducing carbohydrate. The constitution of the products from hydrazines acylated, with carboxylic acids obtainable according to the present process, could not be ascertained with certainty. There is no doubt, however, that they correspond to the general formula

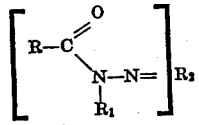

wherein $R-C=O$ is the acyl radical of a carboxylic acid containing at least 12 carbon atoms, $R_1$ is hydrogen, alkyl or aryl (including substituted alkyl and substituted aryl such as hydroxy-alkyl) and $R_2$ is a radical of a water-soluble reducing carbohydrate, the manner in which the two valencies of the unacylated hydrazine nitrogen atom are saturated being uncertain. It is possible that a carbon atom of the carbohydrate radical $R_2$ is united through a double linkage with the nitrogen atom, the oxygen atom of the carbonyl group of the carbohydrate reacting with two hydrazine hydrogen atoms during the condensation reaction. It is, however, also possible that the carbohydrate reacts in the form of a half-acetal, only one of the two hydrazine hydrogen atoms connected with the unacylated nitrogen atom being substituted in this case by the radical $R_2$. In view of this uncertainty the products of the invention are best characterized without formulae.

The products of the present invention are soluble in water, yielding solutions, which are capillary active, but which show no ionic activity. They are distinguished by the property of undergoing decomposition when boiled in an acid solution, whereby cation-active decomposition products are formed. Thanks to their capillary activity the products of the present process may find application for example as textile assistants, for instance wetting, foaming, dispersing, washing, levelling or softening agents, further as assistants in the preparation of fungicides and insecticides, both alone or together with other products usual in the application of capillary active compounds.

The following examples illustrate the invention, the parts being by weight:

Example 1

24 parts of stearic acid hydrazide obtained, for example, by heating stearic acid methylester with hydrazine hydrate are dissolved with 32 parts of anhydrous glucose in 120 parts by volume of hot glacial acetic acid. After the solution has been heated to 75° C. for 50 minutes, a sample of it is clearly soluble in water. The whole is cooled to 15° C. while stirring, filtered and the reaction product is isolated either by distilling the glacial acetic acid in a vacuum or by precipitating with ether. It is a brownish colored powder which is easily soluble in water. The aqueous solution possesses pronounced capillary active properties. On heating for a short time in the presence of mineral acids decomposition occurs, the solution becoming turbid.

The new product corresponds probably to the formula

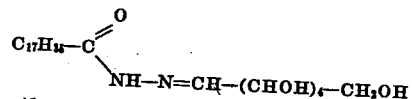

in case the reaction is expressed in terms of open chain carbohydrate formulae. In terms of ring formulae of carbohydrates the formula of the hydrazide is probably

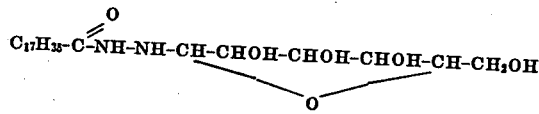

Example 2

36 parts of cocoanut fatty acid hydrazide obtained, for example, by heating cocoanut fatty acid methylester with hydrazine hydrate in the presence of alcohol, are heated with 77 parts of anhydrous glucose and 300 parts by volume of glacial acetic acid until a clear solution is formed. After the solution has been heated for 50 minutes to 80° C. a sample of it is clearly soluble in water. After evaporating in a vacuum and washing out the last portions of the glacial acetic acid with ether, the reaction product is obtained as a brownish mass. The aqueous solution exhibits pronounced wetting properties and an excellent foaming capacity.

The new product corresponds probably to the formula

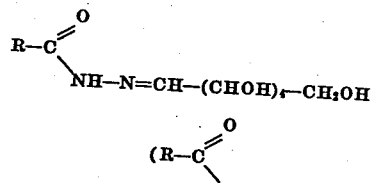

being the acyl radical of the cocoanut fatty acid) in case the reaction is expressed in terms of open chain carbohydrate formulae.

Example 3

3 parts of stearic acid hydrazide and 5.5 parts of maltose are dissolved in 10 parts by volume of hot glacial acetic acid. After heating the solution for 30 minutes on the steam bath a sample of it is clearly soluble in water. By precipitating with ether the condensation product is obtained as a white powder which exhibits properties similar to those of the product from stearic acid hydrazide and glucose obtained according to Example 1.

Example 4

3 parts of stearic acid hydrazide are heated with 5.5 parts of lactose and 10 parts by volume of glacial acetic acid until a clear solution is obtained. After the solution has been heated on the steam bath for about 30 minutes, a sample of it is clearly soluble in water. The solution which has been cooled to 15° C. is filtered and the reaction product is obtained from the filtrate by distilling the glacial acetic acid in a vacuum. The product possesses properties similar to those of the product obtained according to Example 1.

The new product corresponds probably to the formula

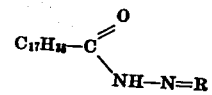

(R being a lactose radical) in case the reaction is expressed in terms of open chain carbohydrate formulae.

Example 5

4 parts of para-stearoylamino-benzoic acid hydrazide obtained for example by heating para-stearoylamino-benzoic acid methylester with hydrazine hydrate in a sealed tube, are dissolved in the heat in 30 parts by volume of glacial acetic acid. 2.7 parts of anhydrous glucose are added whereupon the clear solution is heated for 30 minutes to 70–80° C. After removing the glacial acetic acid in a vacuum a brownish pulverizable mass is obtained. A sample dissolved in little alcohol and diluted with water produces an opalescent, foaming solution which behaves similarly to the product obtained according to Example 1.

Example 6

6 parts of stearic acid hydrazide are dissolved in 20 parts by volume of hot glacial acetic acid. After addition of 5.4 parts of fructose the solution is heated for 30 minutes to 60–70° C. The turbidity which forms thereby is filtered off at the end of the reaction. A sample of the clear solution dissolves in water to a feebly opalescent turbidity. The condensation product is precipitated from the filtrate with ether and filtered. After drying in a vacuum at ordinary temperature a yellowish colored powder is obtained which dissolves in warm water with a faint turbidity.

Example 7

A cotton fabric is padded with a solution containing per liter 10 grams of the product of Example 1, dried and steamed in an atmosphere of steam containing formic acid. The fabric thus treated has an essentially softer handle than the untreated material, this property being also retained even after a soap treatment.

What we claim is:

1. A process for the manufacture of a condensation product, which comprises condensing a higher aliphatic-monoacylated hydrazine, wherein the aliphatic acyl radical contains at least 12 carbon atoms, with a water-soluble reducing carbohydrate by heating the reactants in an organic solvent medium.

2. A process for the manufacture of a condensation product, which comprises condensing a higher aliphatic-monoacylated hydrazine, wherein the aliphatic acyl radical is the acyl radical of an aliphatic carboxylic acid and contains at least 12 carbon atoms, with a water-soluble reducing carbohydrate by heating the reactants in an organic solvent medium.

3. A process for the manufacture of a condensation product, which comprises condensing a higher aliphatic-monoacylated hydrazine, wherein the aliphatic acyl radical is the acyl radical of an aliphatic carboxylic acid and contains at least 12 carbon atoms, with a monosaccharide by heating the reactants in an organic solvent medium.

4. A process for the manufacture of a condensation product, which comprises condensing a higher aliphatic-monoacylated hydrazine, wherein the aliphatic acyl radical is the acyl radical of an aliphatic carboxylic acid and contains at least 12 carbon atoms, with a hexose by heating the reactants in an organic solvent medium.

5. A process for the manufacture of a condensation product, which comprises condensing a higher aliphatic-monoacylated hydrazine, wherein the aliphatic acyl radical is the acyl radical of an aliphatic carboxylic acid and contains at least 12 carbon atoms, with an aldohexose by heating the reactants in an organic solvent medium.

6. A process for the manufacture of a condensation product, which comprises condensing stearic acid hydrazide with glucose by heating the reactants in an organic solvent medium.

7. A process for the manufacture of a condensation product, which comprises condensing cocoanut fatty acid hydrazide with glucose by heating the reactants in an organic solvent medium.

8. A process for the manufacture of a condensation product, which comprises condensing a higher aliphatic-monoacylated hydrazine, wherein the aliphatic acyl radical is the acyl radical of an aliphatic carboxylic acid and contains at least 12 carbon atoms, with a reducing disaccharide by heating the reactants in an organic solvent medium.

9. A process for the manufacture of a condensation product, which comprises condensing stearic acid hydrazide with lactose by heating the reactants in an organic solvent medium.

10. A higher aliphatic-acylated hydrazide wherein one hydrazine nitrogen atom is connected with the acyl radical, said radical being the acyl radical of an aliphatic carboxylic acid and containing at least 12 carbon atoms, and wherein the other hydrazine nitrogen is attached to the radical of a water-soluble reducing carbohydrate, which hydrazide is water-soluble and is split by boiling dilute mineral acid to form a cation-active decomposition product.

11. A higher aliphatic-acylated hydrazide wherein one hydrazine nitrogen atom is connected with the acyl radical, said radical being the acyl radical of an aliphatic carboxylic acid and containing at least 12 carbon atoms, and wherein the other hydrazine nitrogen is attached to the radical of a monosaccharide, which hydrazide is water-soluble and is split by boiling dilute mineral acid to form a cation-active decomposition product.

12. A higher aliphatic-acylated hydrazide wherein one hydrazine nitrogen atom is connected with the acyl radical, said radical being the acyl radical of an aliphatic carboxylic acid and containing at least 12 carbon atoms, and wherein the other hydrazine nitrogen is attached to the radical of a hexose, which hydrazide is water-soluble and is split by boiling dilute mineral acid to form a cation-active decomposition product.

13. A higher aliphatic-acylated hydrazide wherein one hydrazine nitrogen atom is connected with the acyl radical, said radical being the acyl radical of an aliphatic carboxylic acid and containing at least 12 carbon atoms, and wherein the other hydrazine nitrogen is attached to the radical of an aldohexose, which hydrazide is water-soluble and is split by boiling dilute mineral acid to form a cation-active decomposition product.

14. A higher aliphatic-acylated hydrazide wherein one hydrazine nitrogen atom is connected with a hydrogen atom and with the acyl radical of stearic acid, and wherein the other hydrazine nitrogen atom is connected with a glucose radical, which hydrazide is a water-soluble solid substance and is split by boiling dilute mineral acid to form a cation-active decomposition product.

15. A higher aliphatic-acylated hydrazide wherein one hydrazine nitrogen atom is connected with a hydrogen atom and with the acyl radical of cocoanut fatty acid, and wherein the other hydrazine nitrogen atom is connected with a glucose radical, which hydrazide is a water-soluble solid substance and is split by boiling dilute mineral acid to form a cation-active decomposition product.

16. A higher aliphatic-acylated hydrazide wherein one hydrazine nitrogen atom is connected with the acyl radical, said radical being the acyl radical of an aliphatic carboxylic acid and containing at least 12 carbon atoms, and wherein the other hydrazine nitrogen is attached to the radical of a reducing disaccharide, which hydrazide is water-soluble and is split by boiling dilute mineral acid to form a cation-active decomposition product.

17. A higher aliphatic-acylated hydrazide wherein one hydrazine nitrogen atom is connected with a hydrogen atom and with the acyl radical of stearic acid, and wherein the other hydrazine nitrogen atom is connected with a lactose radical, which hydrazide is a water-soluble solid substance and is split by boiling dilute mineral acid to form a cation-active decomposition product.

CHARLES GRAENACHER.
RICHARD SALLMANN.